(No Model.)

D. LUYE.
DEVICE FOR SETTING ANIMAL TRAPS.

No. 606,566. Patented June 28, 1898.

Witnesses
Victor J. Evans
Jos. C. Stack.

Inventor
Dave Luye
by John Wedderburn
Attorney

UNITED STATES PATENT OFFICE.

DAVE LUYE, OF CLEVELAND, MISSISSIPPI.

DEVICE FOR SETTING ANIMAL-TRAPS.

SPECIFICATION forming part of Letters Patent No. 606,566, dated June 28, 1898.

Application filed August 11, 1897. Serial No. 647,861. (No model.)

*To all whom it may concern:*

Be it known that I, DAVE LUYE, of Cleveland, in the county of Bolivar and State of Mississippi, have invented certain new and useful Improvements in Devices for Setting Animal-Traps; and I do hereby declare the following to be a full, clear, and exact description of the invention, such as will enable others skilled in the art to which it appertains to make and use the same.

The invention relates to a device or clamp for setting animal-traps, the object being to obviate danger of injury to the person engaged in setting such traps.

The construction of the traps ordinarily employed for the purpose indicated is well understood, and the powerful springs employed in connection with the necessarily-delicate setting and tripping mechanism renders it not only difficult but unsafe for any one but an expert to attempt to set one of these traps in the usual manner. The object of the present invention is to overcome this difficulty by means of a clamping device adapted to compress and securely hold the trap-springs while the treadle-lever is being set for holding the jaws open until tripped by the animal in the usual manner.

It will be understood from the following description and claims, reference being had to the accompanying drawings, in which—

Figure 1:
Figure 2:
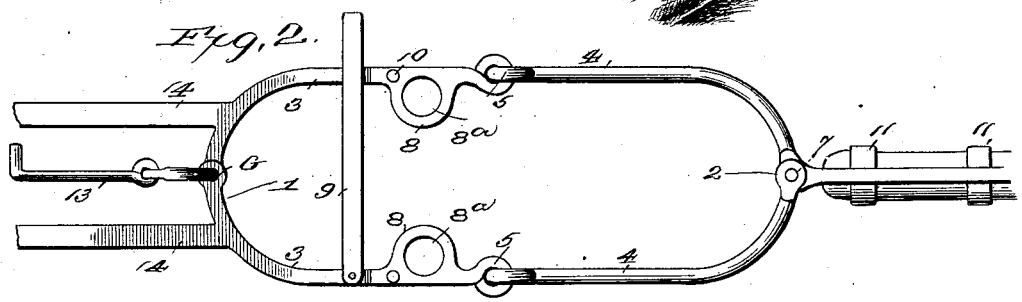
Figure 3:
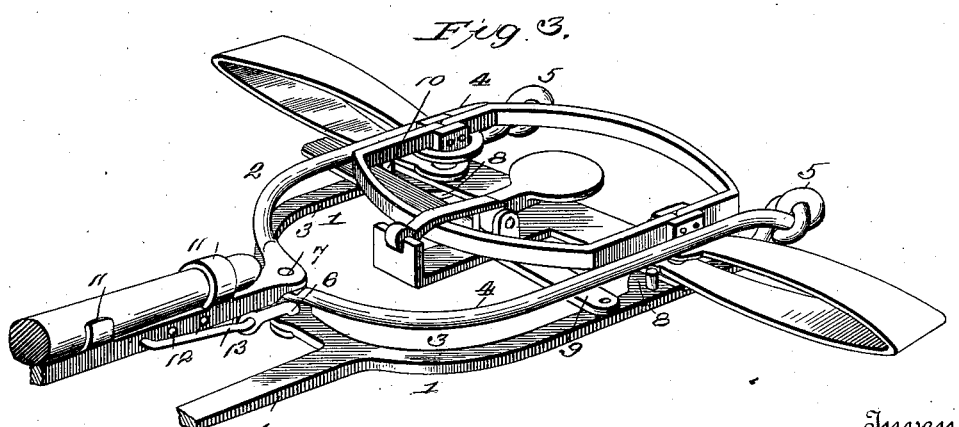

Figure 1 is a perspective view of a trap adapted to be set by the improved clamp. Fig. 2 is a plan view of the clamp opened to receive the trap; and Fig. 3 is a perspective view of the clamp and the trap, showing the springs of the latter compressed and held by the clamp for facilitating the setting of the trap.

1 and 2 indicate the clamping-jaws of the device. These jaws are bifurcated at their adjoining ends, and the arms thereof, (indicated at 3 and 4,) arranged in pairs, are connected at their inner ends by dead-eyes 5 or other suitable form of hinge which permits their free adjustment one upon the other. The arms of the forks are curved inwardly at their outer ends and pivotally connected at 6 and 7 in such manner as to permit their adjustment toward and away from each other for contracting and expanding the forks to adjust them to the size of the trap to be operated upon. The arms 3 adjacent to the hinged connection thereof with the arms 4 are provided with expanded portions or ears 8, perforated at $8^a$ to form a seat for the trap resting upon said arms, said perforations being adapted to receive the screw-threaded ends of the standards to which the jaws of the trap are pivoted and the nuts for securing said standards in place on the base plate or bar of the trap.

9 indicates a cross-bar pivoted to one of the fork-arms 3 and extending transversely across said arms, where the inward movement of its free end toward the seat of the trap is limited by means of a stop or pin 10, said bar being designed to afford a support for the transverse bar upon which the trap-treadle and its retaining-pawl or detent are supported. By the adjustment of the free end of this cross-bar 9 it is adapted to be adjusted to different-sized traps. The free ends of the fork-arms may be provided with any suitable form of handle, and one of the arms of clamp 2 is shown provided with loops 11, adapted to engage a rod for extending its handle for giving increased leverage to the clamp where required. The handle of clamp 2 is shown provided with a series of perforations 12, adapted to receive a hook 13, pivoted to the opposing clamp-arm or loop end of the fork-arms 3, and in any one of which perforations said hook may be inserted for adjusting the relation of the clamping-arms to each other as required. The arms of the fork 3 instead of being provided with a single extension or arm are shown provided each with an extension 14, adapting the handle of clamp 2 to be pressed down between them where required; but a single arm provided with loops for the reception of the rod for giving increased leverage to said arm may be employed, if preferred.

In practice the trap is placed upon the fork-arms 3 with the ends of its jaw-standards and the nuts thereon resting in the perforations or eyes $8^a$ and with the treadle-supporting bar resting upon the cross-bar 9, as shown, the arms of the forks having been adjusted in width to suit the size of the trap to be operated upon. The clamp 2 is now brought over upon the clamp 1, striding the jaws of the trap, and being pressed firmly down serves to compress the springs of said jaws, as indicated in Fig. 3, after which the arm 2 is engaged by the hook 13 for holding the clamping-arms 1 and 2 at the desired adjustment. The trap is now held secure with the jaws open and the treadle of the trap can be set and baited in the usual manner without danger to the operator, after which by releasing the handle of clamp 2 from the hook 13 and opening the clamp the trap can be removed from the clamp and set in any desired position.

By the construction shown the clamping device is adapted to animal-traps of different sizes and for the capture of different wild animals, and the same clamp may be used for any number of traps, enabling the attendant or operator to set the different traps with perfect safety to himself, an operation which under the usual process is one of considerable difficulty and frequently danger to the person engaged in setting the traps.

Having thus described the invention, what I claim as new, and desire to secure by Letters Patent, is—

1. In a device or clamp for setting animal-traps, the pivotally-connected clamping-arms arranged in pairs to stride the trap-jaws and pivotally connected to permit their adjustment to different-sized traps, substantially as described.

2. The combination in a device for setting animal-traps, of the clamping-arms forked to stride the trap and pivotally connected, one of said clamping-forks being provided with a seat for the trap, and means for connecting and holding the free ends of said arms, substantially as described.

3. In a clamping device for setting animal-traps, the bifurcated and pivotally-connected arms thereof, each having the arms of its fork pivotally connected for permitting their adjustment, in combination with means for connecting and holding the free ends of said arms, substantially as described.

4. The combination in a device for setting animal-traps, of the pivotally-connected and adjustable clamping-arms arranged in pairs and adapted to be adjusted to different-sized traps, and the handle extensions of said arms, substantially as described.

5. The combination in a trap-setting clamp, of the forked arms pivotally connected at their adjacent ends, and means for adjustably connecting said arms, one with the other, substantially as described.

6. In a clamping device for setting animal-traps, the forked and pivotally-connected arms thereof, each having the arms of its fork pivotally connected to permit their adjustment, in combination with means for adjustably connecting and holding the free ends of said arms, one of the clamping-forks being provided with a seat for the trap, and a pivoted cross-bar for supporting the treadle-bar of the trap, substantially as described.

In testimony whereof I have signed this specification in the presence of two subscribing witnesses.

DAVE X LUYE.
his mark

Witnesses:
D. C. BUTLER,
J. W. DAVIS.